US009075247B2

(12) United States Patent
Crosby et al.

(10) Patent No.: US 9,075,247 B2
(45) Date of Patent: Jul. 7, 2015

(54) EYEGLASSES AND MEANS FOR THEIR ADJUSTMENT

(75) Inventors: David Crosby, Oxford (GB); Owen Reading, Oxford (GB); Gregor Storey, Oxford (GB); Richard Taylor, Oxford (GB)

(73) Assignee: GICI Labs LLP, Oxfordshire (GB)

( * ) Notice: Subject to any disclaimer, the term of this patent is extended or adjusted under 35 U.S.C. 154(b) by 431 days.

(21) Appl. No.: 13/522,564

(22) PCT Filed: Jan. 17, 2011

(86) PCT No.: PCT/EP2011/050507
§ 371 (c)(1),
(2), (4) Date: Feb. 15, 2013

(87) PCT Pub. No.: WO2011/086177
PCT Pub. Date: Jul. 21, 2011

(65) Prior Publication Data
US 2013/0141692 A1    Jun. 6, 2013

(30) Foreign Application Priority Data
Jan. 18, 2010   (GB) .................................. 1000735.9

(51) Int. Cl.
G02C 7/08      (2006.01)
G02C 5/10      (2006.01)
(Continued)

(52) U.S. Cl.
CPC   *G02C 7/088* (2013.01); *G02C 5/10* (2013.01); *G02C 5/122* (2013.01); *G02C 7/081* (2013.01); *G02C 9/02* (2013.01); *G02C 2200/28* (2013.01)

(58) Field of Classification Search
CPC ........ G02C 5/122; G02C 5/22; G02C 5/2218; G02C 5/2227; G02C 5/2236; G02C 5/2254; G02C 7/08; G02C 7/088; G02C 9/00; G02C 9/02; G02C 9/04; G02C 2202/02
USPC .................. 351/47, 48, 49, 57, 58, 137, 148, 351/159.41, 159.48
See application file for complete search history.

(56) References Cited

U.S. PATENT DOCUMENTS 1,619,659 A    3/1927    Evans
2,545,673 A    3/1954    Pozarik
(Continued)

FOREIGN PATENT DOCUMENTS

CH              277726      12/1951
EP         1 662 276 A1      5/2006

OTHER PUBLICATIONS

Douali MG, Silver JD, May 2004, "Self-Optimised Vision Correction with Adaptive Spectacle Lenses in Developing Countries", Opthalmic and Physiological Optics, vol. 24, Issue 3, pp. 234-241.
(Continued)

*Primary Examiner* — Huy K Mai
(74) *Attorney, Agent, or Firm* — Michael D. Eisenberg

(57) ABSTRACT

Eyeglasses which comprise a pair of optical plates for each eye. Each of the optical plates is made up of a front plate and a rear plate and a return and hinge mechanism links the optical plates of each pair with one another. An adjustment mechanism facilitates relative movement of the optical plates, of each pair, in a plane substantially perpendicular to a viewing direction of the eyeglasses. The return and hinge mechanism and the adjustment mechanism are decoupled.

14 Claims, 13 Drawing Sheets

(51) Int. Cl.
*G02C 5/12* (2006.01)
*G02C 9/02* (2006.01)

(56) References Cited

U.S. PATENT DOCUMENTS

| | | | |
|---|---|---|---|
| 2,818,774 A | 1/1958 | Olnhausen | |
| 3,305,294 A | 2/1967 | Alvarez | |
| 4,974,954 A | 12/1990 | Muller | |
| 5,712,721 A | 1/1998 | Large | |
| 6,848,785 B1 | 2/2005 | Spillman | |
| 6,857,741 B2 | 2/2005 | Blum et al. | |
| 7,338,159 B2 | 3/2008 | Spivey | |
| 7,393,099 B2 | 7/2008 | Koops et al. | |
| 2006/0209431 A1 | 9/2006 | Spivey | |
| 2006/0290880 A1 | 12/2006 | Yu | |
| 2008/0030678 A1* | 2/2008 | Koops et al. | 351/172 |
| 2008/0084532 A1 | 4/2008 | Kurtin | |
| 2009/0051868 A1* | 2/2009 | Kwan | 351/137 |
| 2009/0122425 A1 | 5/2009 | Baron van Asbeck | |

OTHER PUBLICATIONS

Hendriks BHW et al., 2005, "Electrowetting-Based Variable Focus Lens for Miniature Systems", Optical Review, vol. 12, Issue 3, pp. 255-259.

* cited by examiner

EYEGLASSES AND MEANS FOR THEIR ADJUSTMENT

This application is a National Stage completion of PCT/EP2011/050507 filed Jan. 17, 2011, which claims priority from British patent application serial no. 10 007 35.9 filed Jan. 18, 2010.

FIELD OF THE INVENTION

The present invention relates to eyeglasses with variable optical power and means for their adjustment providing for permanent or semi-permanent setting either by an ophthalmic professional or by the wearer.

BACKGROUND

Eyeglasses with variable power across their whole viewable area offer a useful function in situations found in both the developed and developing world. For example, in the developing world, a single model of eyeglass with an appropriate optical power range can be used to correct refractive error in a large section of a population. Such a model may be deployed with little direct involvement by an eyecare professional in the installation process (self refraction reference). The same or similar model can also be used to correct presbyopia amongst adults of forty years of age or more in both developing and developed world situations assuming that model can provide a modest range of positive optical power. Furthermore a variable power function may be advantageous to presbyopic persons as it will allow the wearer to adjust the power of the eyeglasses to suit various tasks such as reading, sewing or other close work.

PRIOR ART

Progressive addition lenses ('PALs') are already known and offer a combination of refractive error correction with a region of positive power (the 'corridor') at a point suitable for reading or close work. Whilst variable-power types of reading eyeglasses have been proposed using fluid-filled (Kurtin, US2008/0084532, Variable focus spectacles, 2007) and electroactive (Blum, U.S. Pat. No. 6,857,741, Electro-active multi-focal spectacle lens, 2003) regions these eyeglasses are designed to be dispensed using a conventional optometric process and supply chain and therefore do not offer a way of correcting the refractive error of a large population by using one model.

The variable optical power is generally achieved by one of three ways.

The first way is to use a fluid-filled lens with a pump actuation method. Such devices are disclosed by Silver and example of such a device has been deployed in the developing world (Douali M G, Silver J D, May 2004, "Self-optimised vision correction with adaptive spectacle lenses in developing countries", Ophthalmic and physiological optics, Volume 24, Issue 3, pp. 234-241).

The second way is to use an electrical system. Such an electrical system may be implemented by using a liquid crystal (Large, U.S. Pat. No. 5,712,721, Switchable Lens, 1995), a liquid crystal/diffractive element hybrid (Blum, U.S. Pat. No. 6,857,741) or an electrostatic lens (Laune, EP1662276, Lens of variable focal length, 2005, Hendriks B H W, et al, 2005, "Electrowetting-based variable focus lens for miniature systems", Optical review, Volume 12, Issue 3, pp. 255-259).

The third way is to use a type of lens disclosed by Alvarez, U.S. Pat. No. 3,305,294, Two-element variable-power spherical lens, 1964 where two optical plates with an identical freeform optical surface are placed in parallel with the optical sum of the two surfaces being dependent on their relative translational offset.

Alvarez Lens Devices

Alvarez-type devices, as described, use two plates, both with a specially-designed freeform surface to create a lens system whose power is the optical sum of the two special surfaces at a particular relative offset.

Spivey, U.S. Pat. No. 7,338,159, Adjustable focus lenses, 2008, describes a lens unit with two lens elements each having special surfaces such that an adjustment of the position of one of the two lens elements relative to the other in a direction generally perpendicular to a viewing direction changes the focusing power of the lens unit. In preferred embodiments two lens units are mounted in a frame to provide eyeglasses with adjustable focus. Several designs are described. Some designs provide for movement side to side movement of the lens elements relative to each other. In other designs the relative motion is up and down. A simple technique is a thumbscrew adjustment that is operated by the wearer. Another design is based on finger force against a friction force. In some preferred embodiments separate frames holding the lens elements pivot about pivot points on the earpiece of a support frame. In other designs two rear lens elements are mounted in a support frame and the front lens elements are mounted in a separate frame that pivots about a point on the earpiece of the support frame. Another design includes a torsion bar assures that the movements of each lens element in one of the lens units is the same as the movements of the lens elements in the other lens unit. Techniques for automatic focusing of the lenses are also disclosed. A disadvantage of relative movement of the lenses in the vertical plane, as described by Spivey, is that the prism term in the vertical axis is more noticeable to the human visual system than an equivalent prism term in the horizontal axis with the result that the useful optical power range of the system is prematurely constrained. Spivey does not disclose eyeglasses comprising a return and hinge mechanism and an adjustment mechanism wherein said two mechanisms are decoupled.

van Asbeck, US2009/0122425, Combined lens and spectacles provided with at least one such combined lens, 2006 describes a combined lens comprising two lens elements lying behind one another along the optical axis of the lens and means for displacing at least one lens element relative to the other lens element in a plane perpendicular to the optical axis of the lens. van Asbeck also relates to spectacles provided with at least one combined lens according to the invention. The object of van Asbeck is therefore to provide a less complex combined eye glass according to the above preamble, with which it is possible to adjust the lens elements relative to one another with a mechanism that can be easily operated. According to van Asbeck the displacement means comprise at least one cam element that can interact with at leas tone of the lens elements. Such a system requires aesthetic sacrifices due to the presence of the temple screw and the rigid structure necessitated by the shear and sliding forces experienced by the system; a system with an undue degree of flexibility would seize up. Cleanliness in storage would also have to be ensured to prevent contamination of sliding surfaces. A further disadvantage of the system is the inability to gain access to the space between the lenses in order to clean away the dirt and other contamination that will potentially accumulate in this area leading to scratching and other impairment of function. The system also implies deployment in a permanently variable mode. Whilst this may be suitable for a presbyopic user who may use the functionally adjustable capability, it is not suitable for deployment to child or younger-adult populations as the design allows for inappropriate adjustment of the eyeglasses' optical power. Further, van Asbeck does not disclose eyeglasses comprising a return and hinge mechanism and an adjustment mechanism wherein said two mechanisms are decoupled.

Koops, U.S. Pat. No. 7,393,099, Glasses, 2007, discloses a glasses for everyday use, comprising a frame into which is fitted a lens system for the correction of defective vision, which comprises at least one pair of lenses formed by a first lens and a second lens, which first and second lens, viewed in the path of vision, are disposed one behind the other and are mutually adjustable for realizing a desired degree of correction of vision, wherein the first lens is coupled with a first adjusting element and the second lens is coupled with a second adjusting element, and the first and second adjusting elements in the assembled state form an integral component of an adjusting organ, and are designed for moving one along the other for the purpose of an adjustment of the lenses. Locating the sprung hinge/translation device at the temple is problematic aesthetically. Further, Koops does not disclose eyeglasses comprising a return and hinge mechanism and an adjustment mechanism wherein said two mechanisms are decoupled.

OBJECT OF THE INVENTION

This invention provides eyeglasses suitable for use in the developed or developing world with variable optical power and a novel, low-cost, simple to assemble adjustment mechanism that allows for permanent or semi-permanent setting either by an ophthalmic professional or by the wearer. The eyeglasses of the invention provide a mechanism for facilitating cleaning of, and removal of other contaminants from the optical plates. The invention also allows for an aesthetically-pleasing design.

SUMMARY OF THE INVENTION

According to a first aspect of the present invention there are provide eyeglasses comprising:

a pair of optical plates for each eye, comprising a front plate and a rear plate;

a return and hinge mechanism linking the optical plates of each pair; and an adjustment mechanism for facilitating relative movement of the optical plates of each pair in a plane substantially perpendicular to the viewing direction;

wherein the return and hinge mechanism and the adjustment mechanism are decoupled.

According to a first preferred version of the first aspect of the present invention the rear plate is laterally moveable.

According to a second preferred version of the first aspect of the present invention or of the first preferred version thereof the return and hinge mechanism comprises cored lugs and a pin. Typically the return and hinge mechanism incorporates resilient biasing means such as, but not limited to, a compression spring.

According to a third preferred version of of the first aspect of the present invention or of any preceding preferred version thereof the return and hinge mechanism incorporate a sliding lock mechanism.

According to a fourth preferred version of the first aspect of the present invention or of any preceding preferred version thereof the return and hinge mechanism incorporates a pair of plate closing cams.

According to a fifth preferred version of the first aspect of the present invention or of any preceding preferred version thereof the adjustment mechanism is adapted to be positioned in the vicinity of a temple of a wearer of the eyeglases.

According to a sixth preferred version of the first aspect of the present invention or any preceding preferred version thereof the adjustment mechanism comprises a temple-hugging clip; a threaded sleeve, and a threaded pushing member comprising a threaded shaft and an adjustment knob.

According to a seventh preferred version of the first aspect of the present invention or any preceding preferred version thereof the adjustment mechanism is detachable from the remainder of the eyeglasses.

According to an eighth preferred version of the first aspect of the present invention or any preceding preferred version thereof the eyeglasses incorporate movable nose pads. Typically the nose pads are rotatably mounted.

According to a second aspect of the present invention there is provided an adjustment mechanism for use with eyeglasses, said eyeglasses comprising a pair of optical plates for each eye, said adjustment mechanism for facilitating relative movement of the optical plates of each pair in a plane substantially perpendicular to the viewing direction, said adjustment mechanism comprising a temple-hugging clip; a threaded sleeve; and a threaded pushing member comprising a threaded shaft and an adjustment knob.

The return and hinge mechanism is only in contact with the adjustment mechanism via the rear optical plate so therefore the two mechanisms are decoupled. The main advantage of a decoupling of the two functions is a subsequent reduction in the precision with which the front plate must be placed within the spectacle frame as correct lateral adjustment between the two optical plates is not dependent upon the frame. Additionally, the precision with which the spectacle frame itself must be manufactured is reduced as the adjustment mechanism merely has to exert a lateral force on the rear optical plate rather than guarantee the delivery of a lateral force along a particular tightly-defined axis.

For the purposes of this description, the spectacle frame is similar to a conventionally-styled 'half-rim' design although the invention is not restricted to such a form.

The following descriptions detail the left-hand side of a set of eyeglasses from the point of view of the wearer; the mirror of this description describes the right-hand side of the same set of eyeglasses from the point of view of the wearer.

Optical Plates

Two optical plates (suitably a pair of optical plates) are disposed in front of the wearer's left eye such that they are aligned in parallel with each other and substantially perpendicular to the optical axis which approximately follows the wearer's line of sight when staring ahead. A pair of optical plates comprises a front plate and a rear plate, the rear plate being closer to the user's eye. The offset of the rear plate from the user's eye is broadly similar to that of conventional eyeglasses. The offset between the two plates is sufficient to avoid collision during use of the eyeglasses under normal operating conditions as described below.

The plates' two facing surfaces in this case are both flat, although it should be appreciated that a variety of surface shapes are possible. The plates' other two reverse surfaces in this case are of a freeform shape, although one of a variety of surface shapes may be used. Of course, this arrangement could be altered to allow for a number of configurations with, for example, the two inner surfaces having freeform shapes and the two outer surfaces being flat or curved.

The front plate is mounted into the frame using any suitable attachment method, although a conventional wire loop fitting into a groove around the plate's peripheral surface has been found to be satisfactory.

Return and Hinge Mechanism

Between the two plates' flat surfaces towards their top edges is a return and hinge mechanism. The hinge function of the mechanism allows the rear plate to swing away from the front plate in order to facilitate cleaning of, and removal of other contaminants from, the two inner surfaces. Naturally, the return and hinge mechanism could be sited towards the lower edges of the optical plates' flat surfaces.

The return function of the mechanism allows the rear plate to move in a direction parallel to that of the hinge's pivot. Thus the rear plate can swing away from the front plate and also slide in a linear direction at the same time. The hinge mechanism is provided with a resilient bias, which urges the rear plate in a predetermined direction. Suitably the resilient bias urges the rear plate towards the left-hand end of the hinge from the point of view of the wearer. Suitably the resilient bias is a compression spring. Alternatively the resilient bias is a tension spring.

Mechanically the mechanism consists of cored lugs on both flat surfaces which are held together with a pin in the manner of a conventional hinge. The rear optical plate has a first and second lug and the front optical plate a third lug. The three lugs' cores are held in position axially with respect to each other by a pin. The third lug allows linear and rotational movement within it whilst the first and second lugs hold the pin firmly. As mentioned previously a compression spring is placed between the first and third lugs such that it urges the rear plate to move to the left with respect to the front optical plate. Alternatively, a tension spring could be mounted between the second and third lugs in order to provide an equivalent force.

Obviously the above mechanical arrangement does not cause the rear plate to be fixed such that sliding or rotating movement is prevented. Two other features are needed.

The first feature is a sliding lock component that is positioned on the pin in between the third lug and the second lug. When the sliding lock component is brought into contact with the third lug, friction between the sliding lock component and the pin is sufficient to overcome the return force exerted by the spring and prevent sliding movement. This sliding lock component can be left in place or it can be fixed in place by means of a locking screw, a wedge between the sliding lock and pin, or a drop of adhesive; the first option allows for subsequent readjustment of optical power by the wearer, whilst the latter two fix the optical power of the assembly. Alternatively the lock component can be threaded to engage with a corresponding thread on the pin; when the lock component is screwed into place against the third lug, the resulting thread friction is sufficient to prevent movement of the rear optical plate along the pin.

The second feature is a pair of plate closing cams; in this case a first cam is part of or attached to the third lug and a second engaging cam rests against the peripheral side of the rear plate and is able to slide along both the pin and the rear plate. However, the first cam can be attached to any suitable parts of the assembly. The cams engage with the compression spring such that in the closed position the engaging surfaces of the cam contrive to urge the optical plates towards each other by exerting a closing force around the pin; the second cam acts as a rotational lock. However, when the wearer flips open the rear optical plate, the cams' engaging surfaces are able to ride over each other until two engaging flat surfaces come into contact with the result that the rear optical plate will tend to stay in an open position. Once cleaning is complete, a minimal closing force exerted by the wearer will bring the cams' engaging surfaces into contact and allow the compression spring to force the rear optical plate back towards the front optical plate.

An enhancement to the action of the plate closing cams is the addition of a second spring in between the left-most cam and a fourth lug on the rear side of the front plate. This fixed lug ensures that the second spring provides a constant force against the cams such that the resulting closure force is constant when the rear plate is at any point of its lateral travel. Therefore the opening action of the rear optical plate is not too stiff at the left-most position of travel and not too slack at the right-most position of travel.

The above mechanical description illustrates the case of broadly linear lateral by the rear (or front) optical plate with respect to its neighbouring optical plate. One can also imagine the case of two curved (in one or more directions) optical plates. In this case, one could slide one of the optical plates in a linear direction, or one could slide it along a curved path. Such a curved path may describe an arc whose radial centre matches or is close to that of the radius of curvature of one or both optical plates. In order to implement this one may use a curved pin and mechanical arrangement substantially similar to the above, or one may use one or more slotted guidance components sited towards the edges of the optical plates.

The reader will appreciate that the important features of the mechanism are the presence of the various geometrical features and their interactions rather than how those geometrical features are implemented. Therefore, for example, the four lugs mentioned may be discrete components that are attached onto the two plates or may be integrated with the front and rear plates.

Adjustment Mechanism

At the temple of the eyeglass frame is located the adjustment mechanism. In a first general case it may be composed of a temple-hugging clip, a threaded sleeve, and a threaded pushing member comprising a threaded shaft and an adjustment knob.

In a second general case it may also be composed of a threaded sleeve member attached onto the rear of the front plate and a two-part threaded pushing member comprising a threaded shaft and a detachable adjustment knob.

First Adjustment Mechanism Case

The temple-hugging clip is designed such that it can hold onto the temple of the eyeglasses with a reasonable degree of rigidity. It is temple hugging as it is preferable that there is some resistance to the clip being dismounted from the temple. The clip can also be slid or otherwise removed from the temple region, preferably when the sidearm is folded inwards; the clip's shape may therefore take into account the presence of the hinge in this area by being in the general form of a C-section or any other suitable shape in that area. It is possible to prevent detachment of the clip from the temple when the side arms are opened (i.e. as in when the eyeglasses are being worn) by means of a suitable projection from the side arm that interferes with the clip.

Attached by any suitable means to the temple-hugging clip is a threaded sleeve. The axis of the thread is broadly aligned with the rear optical plate's intended direction of travel during adjustment. The temple-hugging clip and threaded sleeve can be manufactured as one component in order to reduce part cost. They can also be produced as separate components and assembled in a jig together with the temple. This will allow any variations in angle of the temple with respect to the front of the eyeglasses frame to be taken into account before the two components are permanently joined together.

Within the threaded sleeve is a threaded pushing member. In its simplest form, this threaded pushing member comprises an adjustment knob and a threaded shaft. The end of the threaded shaft distal to the adjustment knob comes into contact with the left-hand side of the rear plate. Lateral positioning of the rear optical plate is therefore accomplished by rotation of the adjustment knob; rotation causing the threaded shaft to push towards the rear plate causes the rear plate to move to the right whilst rotation in the opposite direction causes the resilient bias to force the rear plate to the left in order to maintain contact with the tip of the threaded shaft. The thread used to cause adjustment may be either left-handed or right-handed. If the thread on the left temple is left-handed and the thread on the right temple is right-handed, then a wearer will have the feeling of turning both adjustment knobs forward to achieve the same direction of adjustment.

Such a mechanism can be implemented using components with relatively simple geometry whose manufacture and assembly is done at low cost. For example, two simple extrusion-manufactured pieces can be used to clip onto the temple and provide the material for the screw-threaded hole respectively. Both these parts can then be joined using a variety of suitable processes such as adhesive bonding or ultrasonic welding.

Second Adjustment Mechanism Case

The threaded sleeve member is attached or mounted onto the rear surface of the front optical plate such that the axis of the sleeve is broadly aligned with the rear optical plate's intended direction of travel during adjustment. The threaded sleeve member can be made up of one or more separate components and assembled onto the front optical plate or it can be an integral part of the optical plate.

Within the threaded sleeve member is a two-part threaded pushing member that consists, in its simplest form, of a threaded shaft and detachable adjustment knob. A collar may be extended from the thread of the threaded sleeve member to cover the threaded shaft in order to block intended or accidental interference with the thread.

Between the threaded pushing member and detachable adjustment knob is a means of ensuring adequate transmission of rotational motion of the adjustment knob to the threaded shaft. Ideally this will involve interlocking geometry of some kind, although other methods are possible. Additionally a means of urging the detachable adjustment knob to stay attached to the threaded shaft may be included, such as magnetic attraction or any other suitable method. Such means of urging the detachable adjustment knob to stay attached to the threaded shaft may be either single-use or multi-use. The force required to detach the detachable adjustment knob from the threaded shaft is ideally enough to ensure that the two components do not part accidentally during normal use but is not so great that a tool is required to separate the two parts. It is easily appreciated that in this case, "two-part" does not mean that only two components may be used in the two-part threaded pushing member, but that the two-part threaded pushing member is disposed of two entities.

Of course, the detachable adjuster knob and threaded shaft may be produced and provided as one piece. Detachment would be performed by breaking the detachable adjuster knob off at a predetermined location or area on its body.

The end of the threaded shaft proximal to the wearer's nose comes into contact with the left-hand side of the rear plate. Lateral positioning of the rear optical plate is therefore accomplished by rotation of a detachable adjustment knob; rotation causing the threaded shaft to push towards the rear plate causes the rear plate to move to the right whilst rotation in the opposite direction causes the resilient bias to force the rear plate to the left in order to maintain contact with the tip of the threaded shaft. The thread used to cause adjustment may be either left-handed or right-handed. If the thread on the left temple is left-handed and the thread on the right temple is right-handed, then a wearer will have the feeling of turning both adjustment knobs forward to achieve the same direction of adjustment.

This second case has a number of advantages.

Firstly, adjustment of the rear optical plate can be achieved before the detachable adjustment knob is removed leaving the exterior of the temple free of any intrusive features leading to an aesthetically pleasing form.

Secondly, as the adjuster mechanism is not mounted onto the eyeglass frame, a wider range of eyeglass frame styles may be used with the only necessary requirement being that the eyeglass frame does not come into physical conflict with the adjuster mechanism.

Thirdly, as the adjustment mechanism is decoupled from the return and hinge mechanism, the tolerance requirements for placing the adjuster mechanism are not as great as they would otherwise be.

Fourthly, both left and right adjusters may be adjusted using one detachable adjuster knob. This saves materials and also encourages correct use of the device where only one eye's optical plate pair is adjusted at a time.

Finally, fixed set of eyeglasses may be easily produced by inserting an adhesive into the threads of the adjuster mechanism and/or at the sliding lock.

As in the first case, such a mechanism can be implemented using components with relatively simple geometry whose manufacture and assembly is done at low cost.

Movable Nose Pads

It will be obvious that if the rear optical plate is pushed far enough towards the wearer's nose then, depending on the exact styling of the frame and shape of the optical plates, the rear plate may strike the nose pads when it is flipped open.

Therefore in this example, nose pads are provided which are rotably mounted on stalks such that they are able to swing away from the rear optical plate in order to allow it to open outwards. Naturally, the nose pads may also be mounted on flexible stalks that may be bent elastically to one side instead of rotating.

BRIEF DESCRIPTION OF THE FIGURES

Exemplary embodiments of the invention will now be described with reference to the accompanying figures in the form of line drawings.

First Exemplary Embodiment.

First Exemplary Embodiment (FIGS. 1 to 21)

A set of eyeglasses consists of a front frame, two pairs of optical plates (one pair for each eye), a return and hinge mechanism between the two optical plates of each pair, two movable side arms 24, a set of hinged nose pads 22 and nose bridge section 14 between the two pairs of optical plates, and an adjustment mechanism sited at both temples. The return and hinge mechanism is only in contact with the adjustment mechanism via the rear optical plate.

For the purposes of this description, the spectacle frame is similar to a conventionally-styled 'half-rim' design although the invention is not necessarily restricted to such a form.

The following embodiment details the left-hand side of a set of eyeglasses from the point of view of the wearer; the mirror of this description describes the right-hand side of the same set of eyeglasses from the point of view of the wearer.

Optical Plates

Two optical plates are disposed at a point in front of the wearer's left eye such that they are aligned in parallel with each other and substantially perpendicular to the optical axis which approximately follows the wearer's line of sight when staring ahead. The offset of the rear plate from the user's eye is broadly similar to that of conventional eyeglasses. The offset between the two plates is sufficient to avoid collision during use of the glasses under normal operating conditions.

The plates' two facing surfaces are both flat whilst the other two reverse surfaces are of a generally freeform shape.

The front plate is mounted into the frame using a conventional wire loop fitting into a groove around the plate's peripheral face.

Return and Hinge Mechanism

Between the two plates' flat surfaces towards their top edges is a return and hinge mechanism, features of which are shown in FIGS. 3 to 9.

Figure 1:
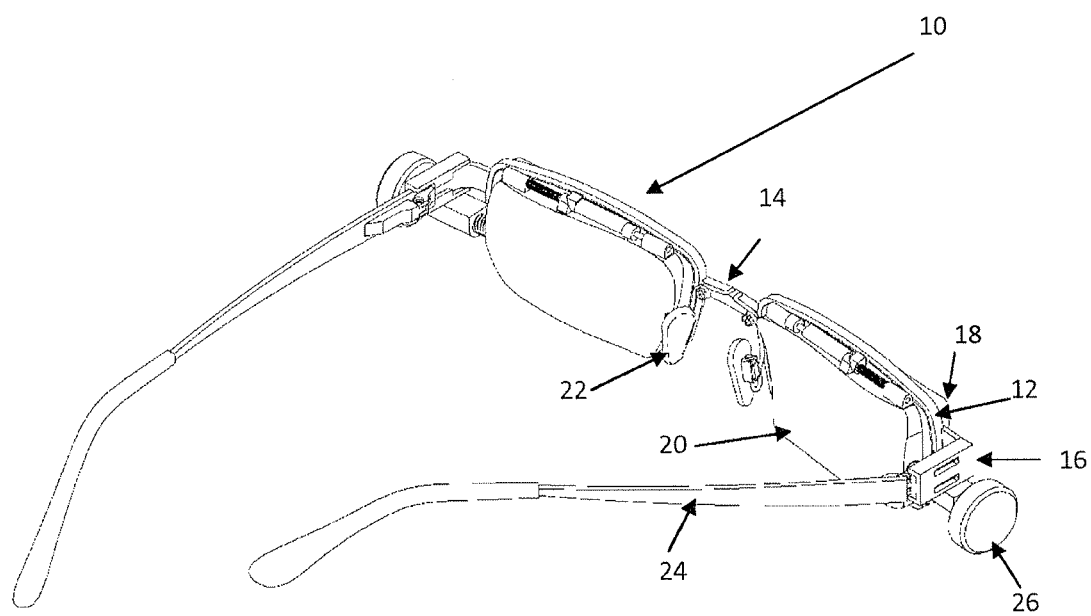
FIG. 1 Eyeglasses with frame, nose bridge, temples, front optical plates, rear optical plates, nose pads and arms according to the invention—rear view with adjustment mechanisms attached FIG. 2 Eyeglasses with frame, nose bridge, temples, front optical plates, rear optical plates (obscured), nose pads and arms according to the invention—front view with adjustment mechanisms attached FIG. 3 Two optical plates with simple return and hinge mechanism—isometric view FIG. 4 Two optical plates with simple return and hinge mechanism—view from wearer's side of frame FIG. 5 Two optical plates with enhanced return and hinge mechanism featuring plate closing cams and slide locking component FIG. 6 Two optical plates with enhanced return and hinge mechanism featuring plate closing cams (arrowed) and slide locking component FIG. 7 Plate closing cam feature FIG. 8 Two optical plates with enhanced return and hinge mechanism featuring plate closing cams, dedicated closing cam spring (arrowed) and slide locking component FIG. 9 Slide lock component in locked position FIG. 10 Adjustment mechanism mounted onto frame temple with open side arm demonstrating clearance between adjustment mechanism body and hinge FIG. 11 Detachment of adjustment mechanism from frame temple with side arm closed FIG. 12 Adjustment mechanism attached onto frame temple with side arm closed FIG. 13 Rear view of adjustment mechanism mechanism FIG. 14 Top view of adjustment mechanism mechanism mounted onto temple with side arm closed FIG. 15 Adjustment mechanism mounted onto temple with side arm not shown for clarity FIG. 16 Rotably mounted nose pads in normal position—isometric rear view FIG. 17 Rotably mounted nose pads in normal position—isometric front view FIG. 18 Rotably mounted nose pads in normal position—rear view FIG. 19 Rotably mounted nose pads, left pad in swung in position—rear view FIG. 20 Alternative embodiment of rotably mounted nose pads—rear isometric view Second Exemplary Embodiment FIG. 21 Eyeglasses with frame, nose bridge, temples, front optical plates, rear optical plates, nose pads and arms according to the invention—front view with adjustment mechanisms detached
Figure 2:
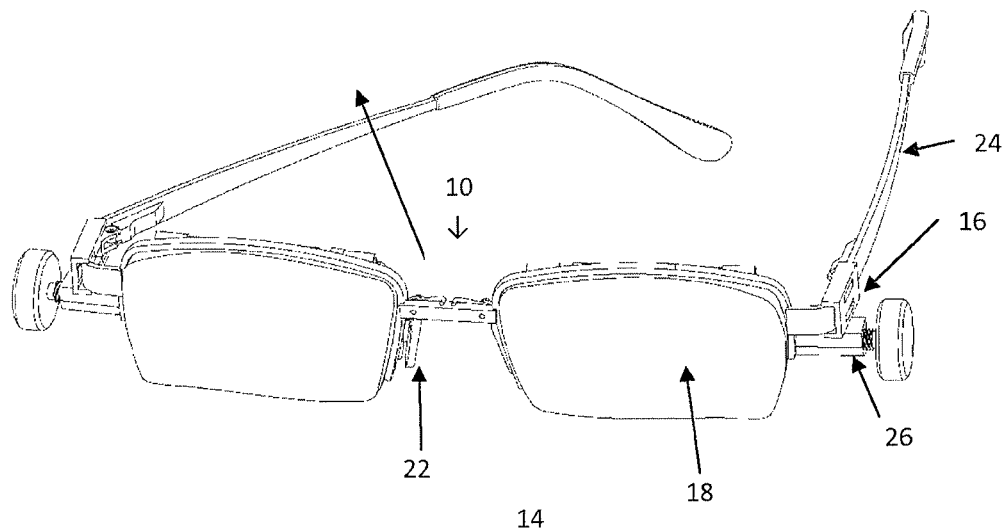
Figure 3:
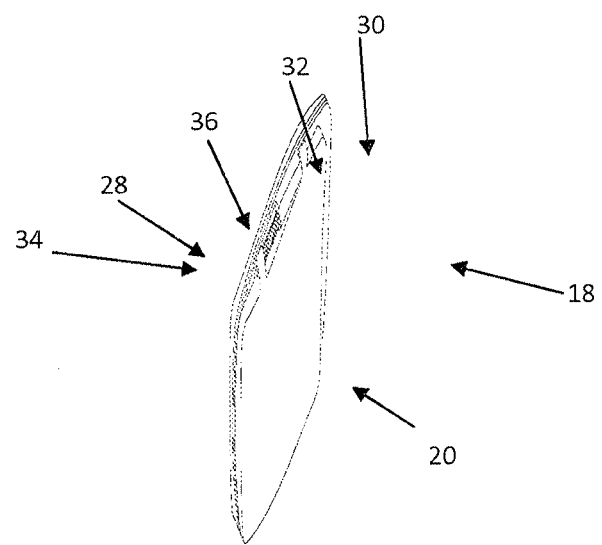
Figure 4:
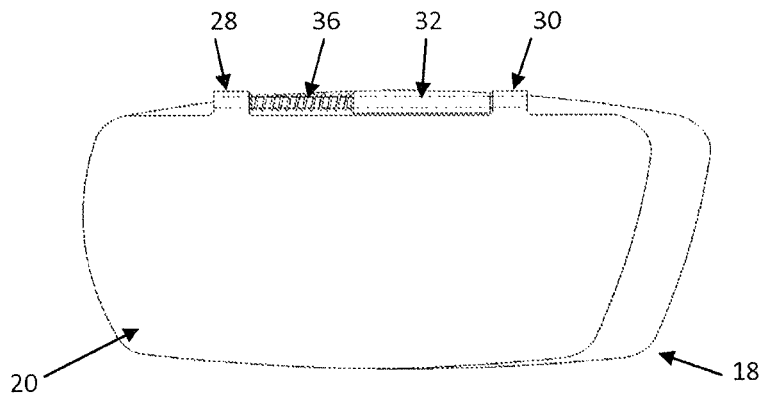

Mechanically the mechanism consists of cored lugs on both flat surfaces which are held together with a pin in the manner of a conventional hinge as shown in FIGS. 3 and 4. The cored lugs 28, 30 and 32 are components that are separate from the optical plates but which have been joined onto the optical plates. The rear optical plate 18 has a first 28 and second 30 lug and the front optical plate 18 a third lug 32. The three lugs' cores are held in position axially with respect to each other by a pin 34. The third lug 32 allows linear and rotational movement within it whilst the first 28 and second 30 lugs hold the pin 34 firmly. A compression spring 36 is placed between the first 28 and third 32 lugs such that it urges the rear plate to move to the left with respect to the front optical plate 18.

Figure 5:
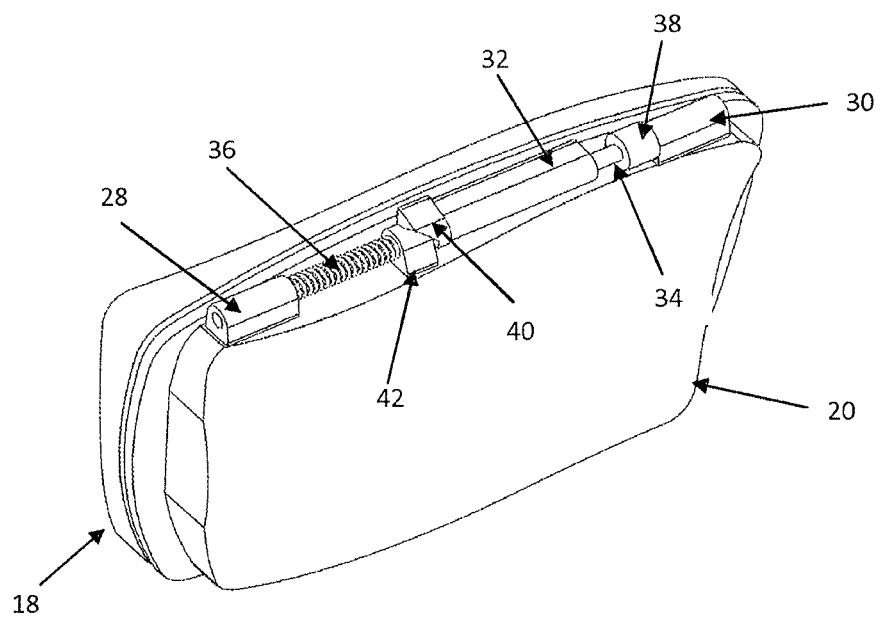
Figure 6:
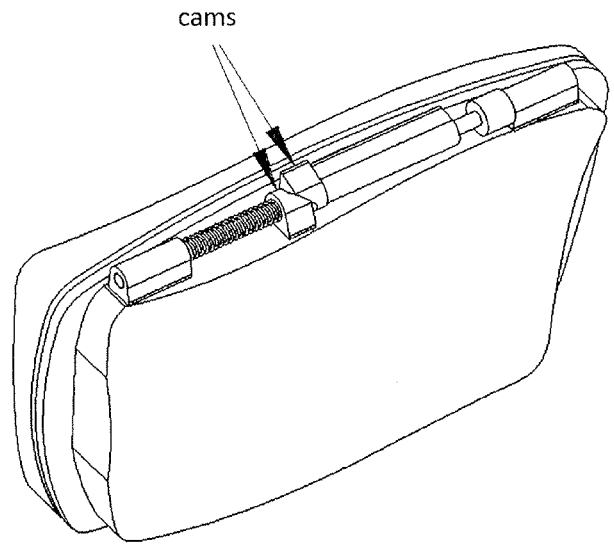
Figure 9:
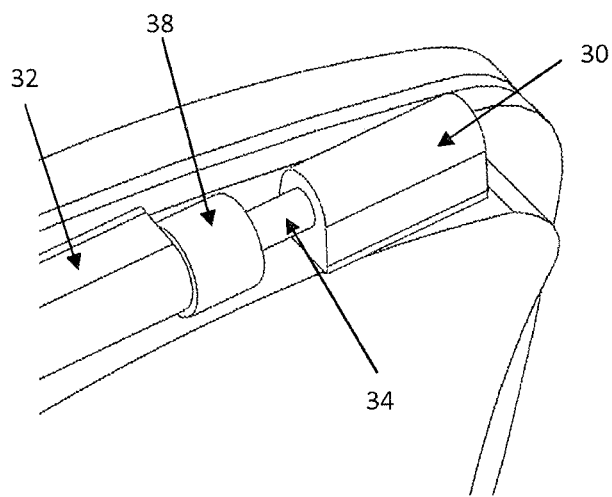
Figure 10:
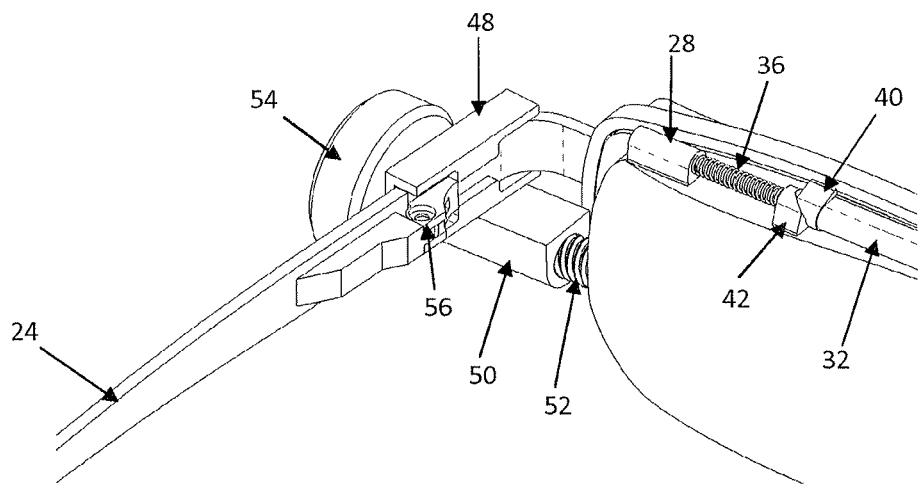
Figure 11:
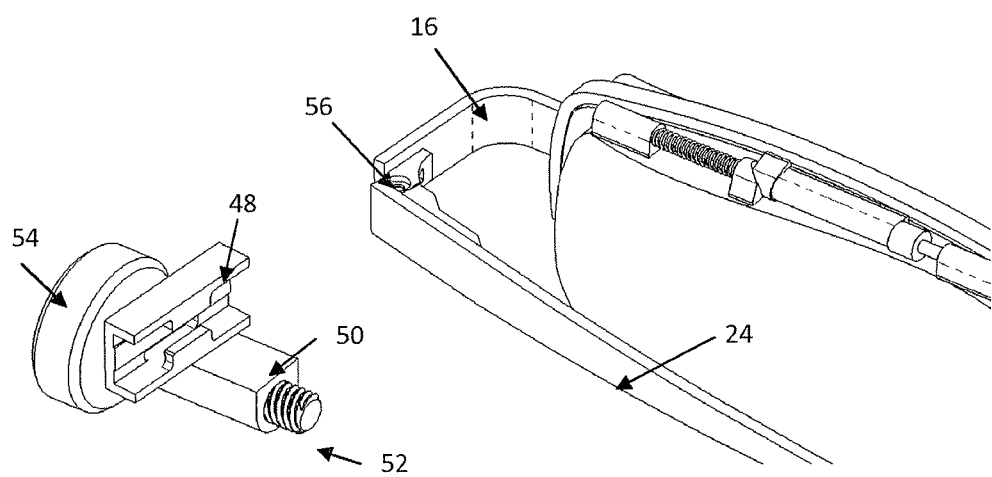
Figure 12:
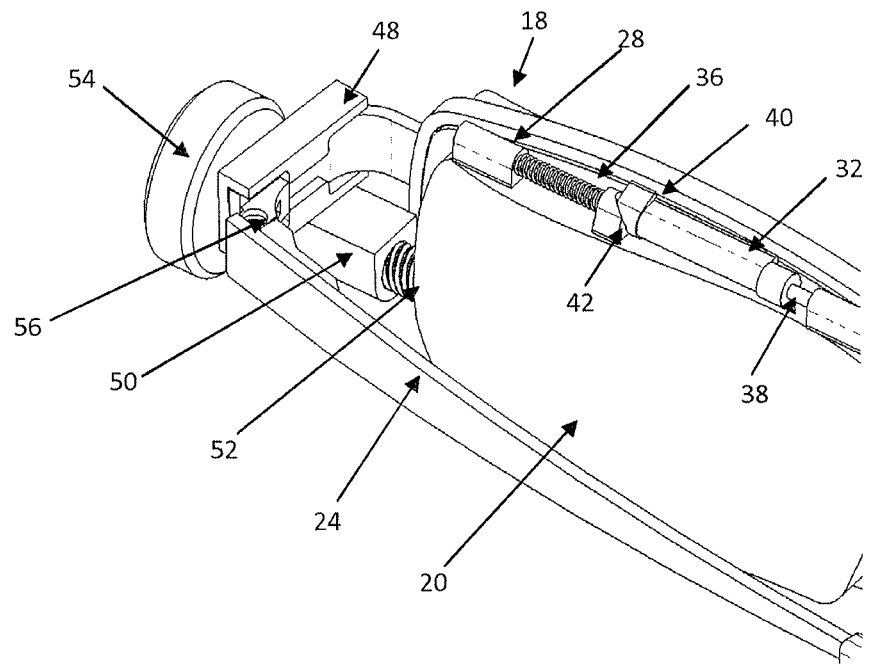

A sliding lock component 38 is positioned on the pin in between the third lug 32 and the second lug 30 as shown in FIGS. 5 and 6. When the sliding lock component 38 is brought into contact with the third lug 32 as shown in FIG. 9, friction between the sliding lock component 38 and the pin 34 is sufficient to overcome the return force exerted by the spring and prevent sliding movement. This sliding lock component 38 can be left in place or it can be fixed in place by a drop of adhesive.

A pair of plate closing cams 40 and 42 as shown in FIGS. 5 and 6 is also included; a first cam 40 is part of or attached to the third lug and a second engaging cam 42 rests against the peripheral side of the rear plate and is able to slide along both the pin 38 and the rear plate 20. The pin 34 passes through the centre of both cams. The cams 40 and 42 engage with the compression spring 36 such that in the closed position the engaging surfaces of the cam contrive to urge the optical plates 18 and 20 towards each other by exerting a closing force around the pin. However, when the rear optical plate 20 is opened, the cams' engaging surfaces are able to ride over each other until two engaging flat surfaces come into contact with the result that the rear optical plate 20 will tend to stay in an open position. Upon reclosing, a minimal closing force exerted by the wearer will bring the cams' engaging surfaces into contact and allow the compression spring to force the rear optical plate back towards the front optical plate.

Figure 7:
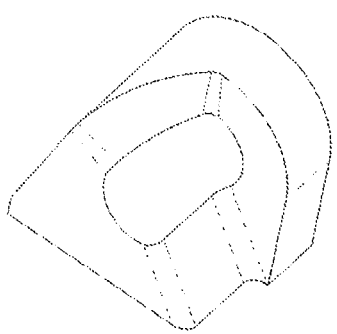

A plate closing cam is shown in FIG. 7.

Figure 8:
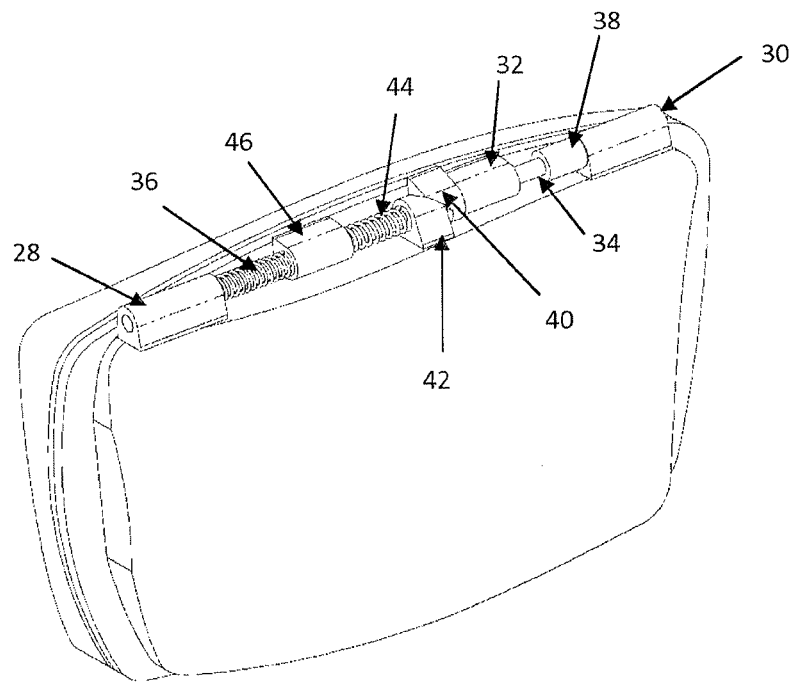

An enhancement to the action of the plate closing cams is shown in FIG. 8. The addition of a second spring 44 in between the left-most cam and a fourth lug 46 on the rear side of the front plate 18. This fixed lug 46 ensures that the second spring 44 provides a constant force against the cams such that the resulting closure force is constant when the rear plate is at any point of its lateral travel. Therefore the opening action of the rear optical plate is not too stiff at the left-most position of travel and not too slack at the right-most position of travel.

Adjustment Mechanism

Features of the adjustment mechanism are shown in FIGS. 10 to 15.

At the temple 16 of the eyeglass frame is located the adjustment mechanism 26. In general it is composed of a temple-hugging clip 48, a threaded sleeve 50, and a threaded pushing member comprising a threaded shaft 52 and an adjustment knob 54.

The temple-hugging clip 48 is formed of a C-section piece of plastic which may slide with an appropriate amount of friction over the eyeglass frame temple 16; the "gap" on the right hand side of the temple-hugging clip 48 allows movement to be unrestricted by the presence of a hinge 56 on the inner side of the temple.

Joined onto the bottom of the temple-hugging clip 48 is a threaded sleeve 50 whose major axis is approximately parallel to the flat surface of the rear optical plate 20.

Joined onto the temple-hugging clip 48 is a threaded sleeve 50. The axis of the thread is broadly aligned with the rear optical plate's 20 intended direction of travel during adjustment.

Within the threaded sleeve 50 is a threaded pushing member comprising a threaded shaft 52 and an adjustment knob 54. The end of the threaded shaft 52 distal to the adjustment knob 54 comes into contact with the left-hand side of the rear plate 20. Lateral positioning of the rear optical plate 20 is therefore accomplished by rotation of the adjustment knob 54; rotation causing the threaded shaft 52 to push towards the rear plate 20 causes the rear plate 20 to move to the right whilst rotation in the opposite direction causes the spring 36 to force the rear plate 20 to the left in order to maintain contact with the tip of the threaded shaft 52. The thread used to cause adjustment in this case is a left-hand thread. In the case of the adjustment mechanism on the other temple, the thread used is a right-hand thread.

Movable Nose Pads

Movable nose pads are provided as shown in FIGS. 16 to 20.

Nose pads 22 are provided which are rotably mounted on stalks 58 such that they are able to swing away from the rear optical plate 20 in order to allow it to open outwards. Said rotatable mounting is attached to the eyeglass frame 10 at the nose bridge 14.

Second Exemplary Embodiment (FIGS. 21 to 26)

Figure 13:
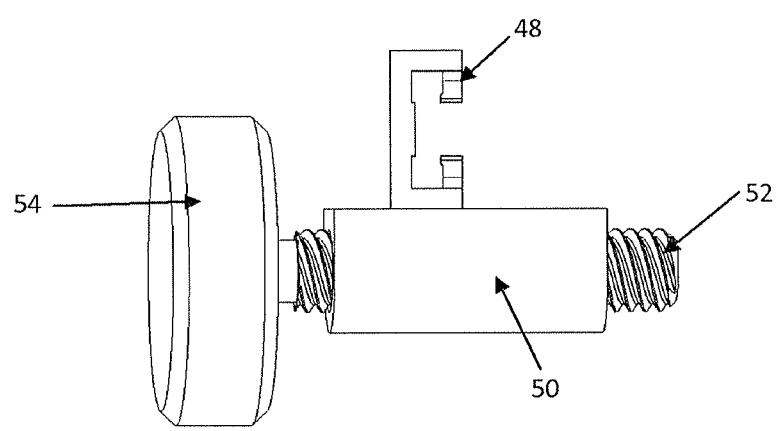
Figure 14:
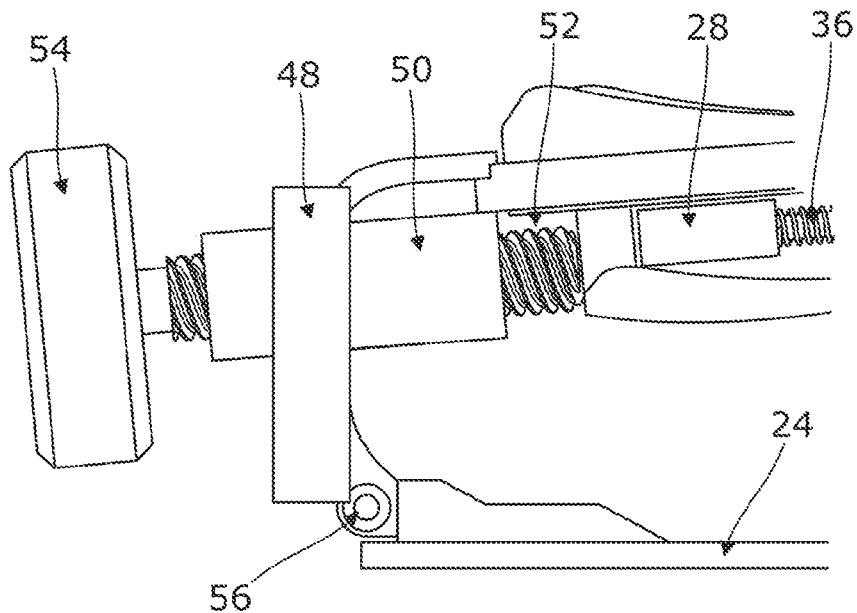
Figure 15:
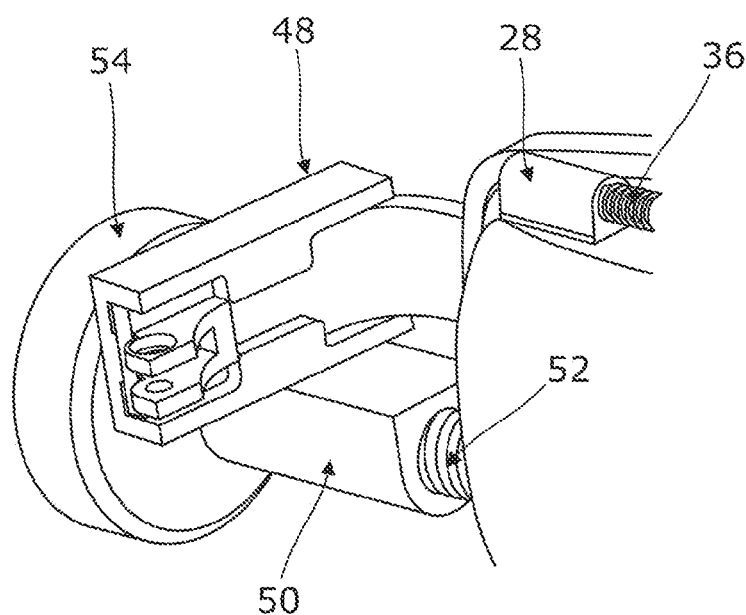
Figure 16:
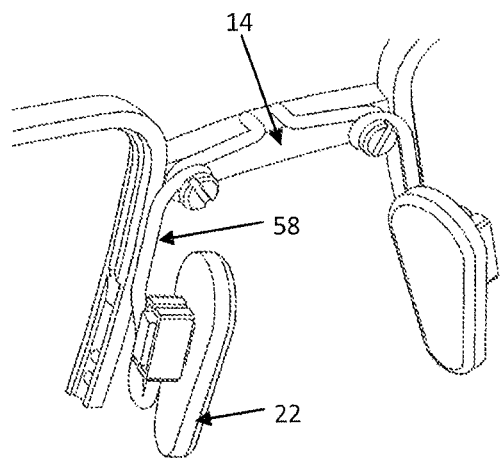
Figure 17:
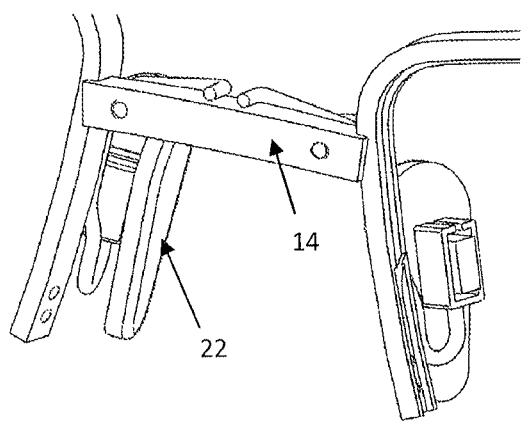
Figure 18:
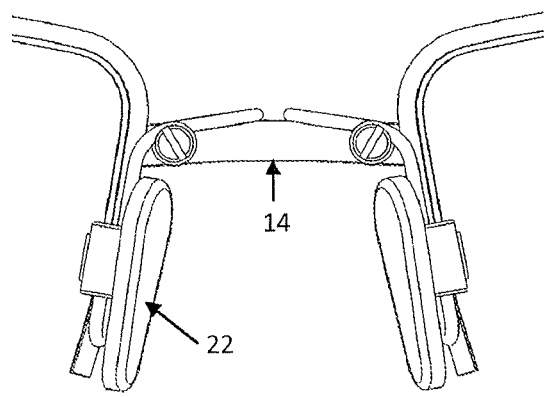
Figure 19:
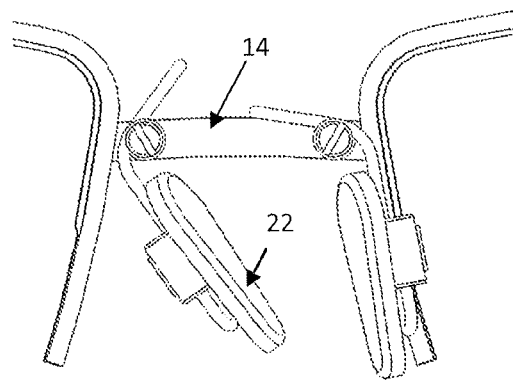
Figure 20:
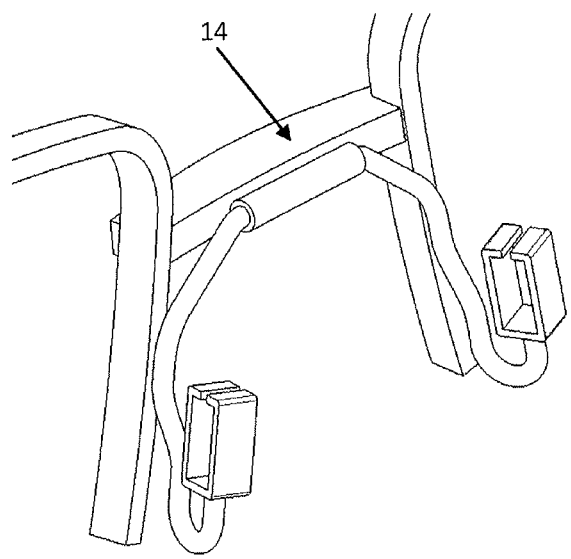
Figure 21:
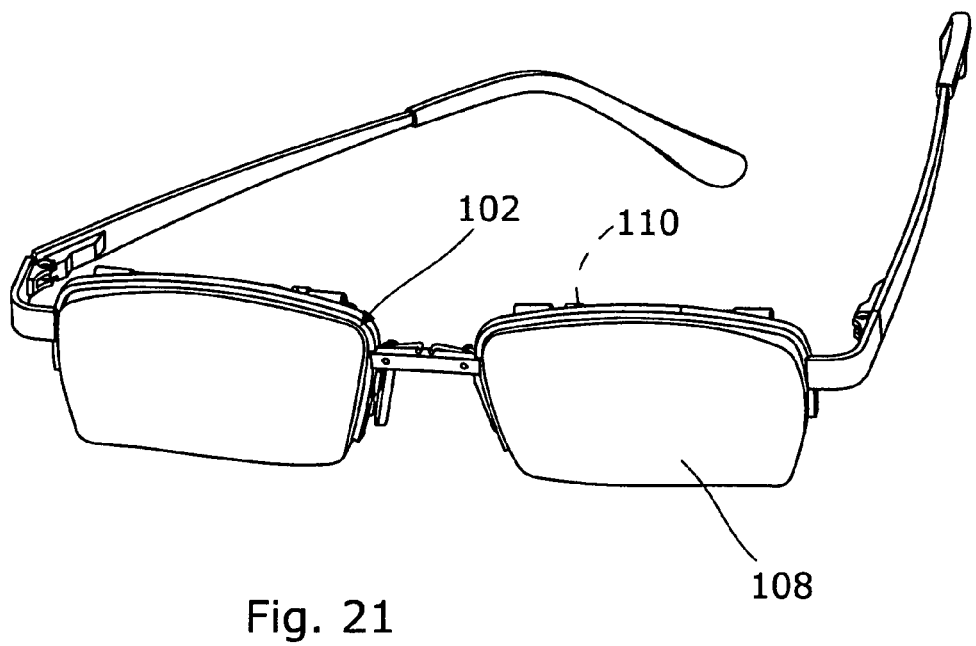
Figure 22:
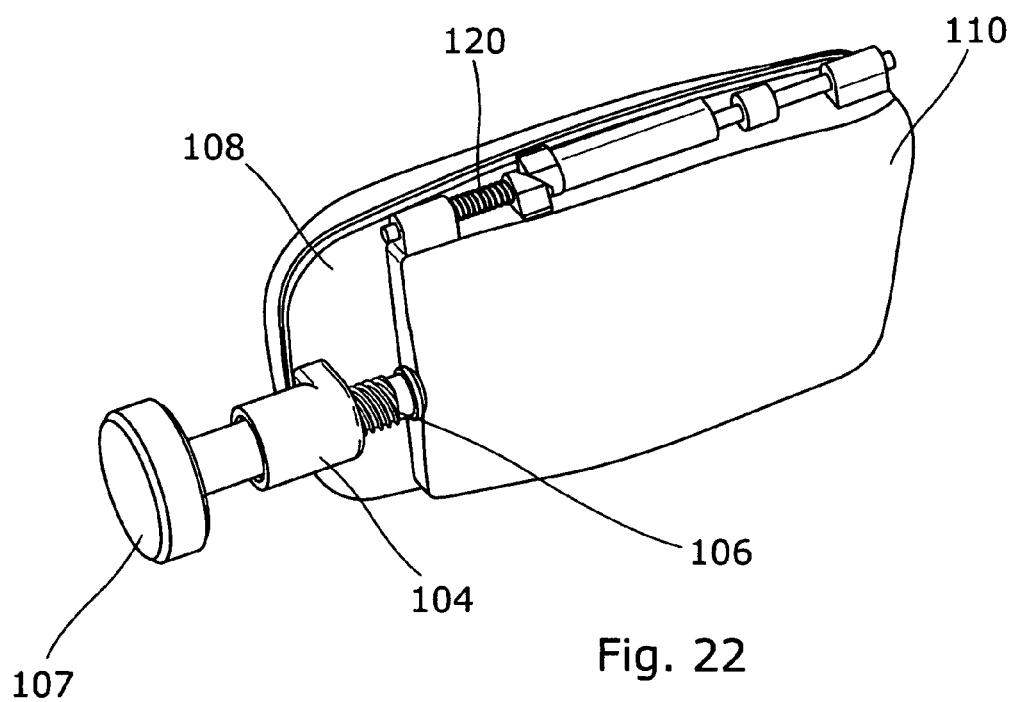
FIG. 22
Figure 23:
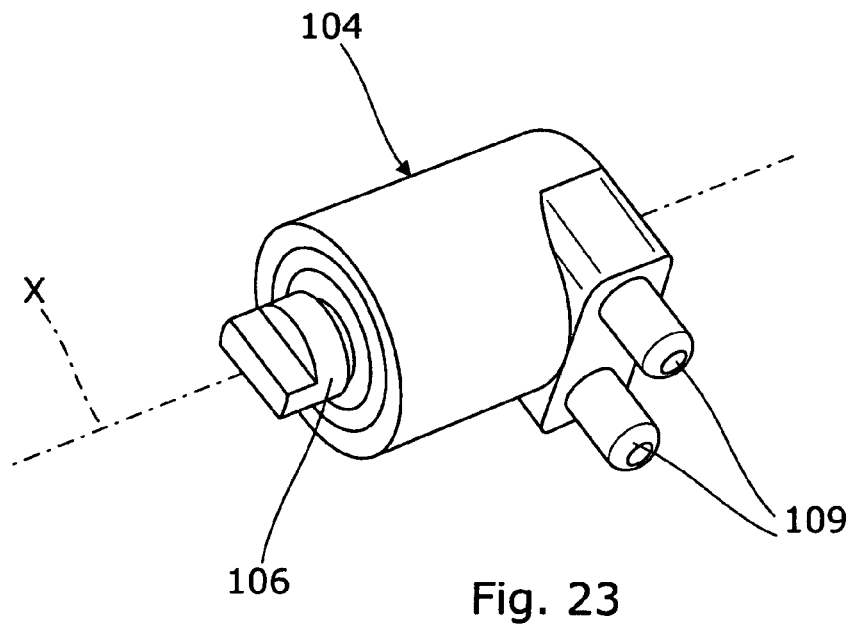
FIG. 23 View of threaded shaft member with mounting pins.
Figure 24:
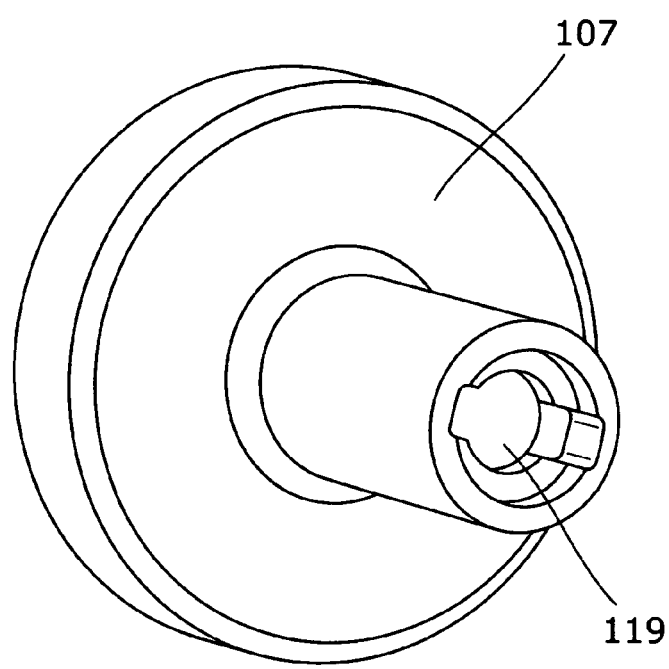
FIG. 24 View of detachable mounting knob
Figure 25:
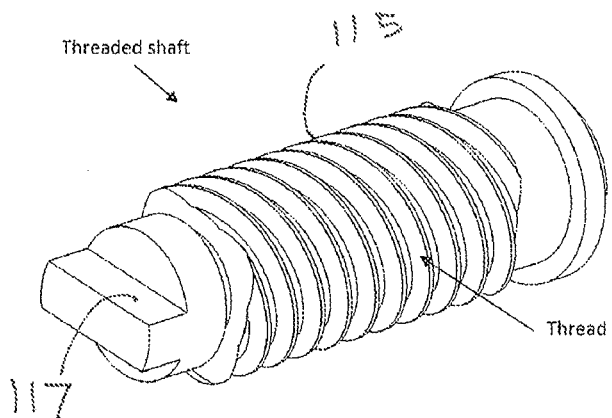
FIG. 25 is a perspective view of a threaded shaft.
Figure 26:
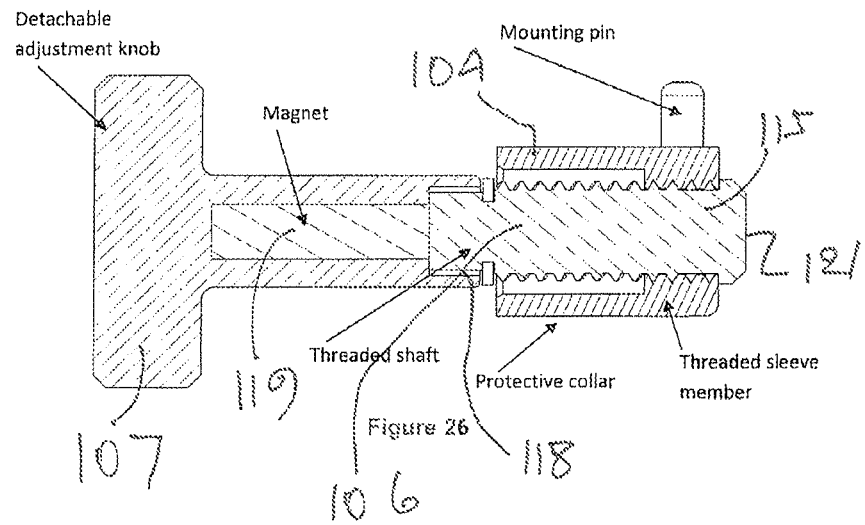
FIG. 26 Sectioned view of adjustment mechanism.

FIG. 21 shows eyeglasses according to the invention for use with the attachable adjustment mechanism shown in FIG. 13.

At the temple 101 of eyeglass frame 102 is located adjustment mechanism 103. The adjustment mechanism 103 includes a threaded sleeve member 104 and a two-part threaded pushing member comprising a threaded shaft 106 and a detachable adjustment knob 107.

The threaded sleeve member 104 is attached onto a front plate 108 by means of pins 109 that are fixed in place in holes (not shown) in the front plate 108. Major axis X of the threaded sleeve member 104 is approximately parallel to the flat surface of rear optical plate 110. Axis X of the sleeve member 104 is broadly aligned with the intended direction of travel of the rear optical plate 110 during adjustment. A protective collar 111 extends from the threaded sleeve member 104 in a direction away from a wearer's nose. The positions and geometry of the threaded sleeve member 104 and detachable adjustment knob 107 ensures that undesired physical contact with eyeglass frame 102 is avoided.

Within the threaded sleeve member 104 is a two-part threaded pushing member comprising threaded shaft 115 and adjustment knob 107. In this embodiment the threaded shaft 115 is made of stainless steel. The threaded shaft 115 and the detachable adjustment knob 116 are coaxially aligned and have interlocking geometries at an interface between the two parts. In this case a flat projection 117 from the threaded shaft 115 sits inside a slot 118 in the detachable adjustment knob 107. Additionally a magnet 119 is sited inside the detachable adjustment knob 107 causing the threaded shaft 115 to be attracted to the detachable adjustment knob 107.

The end of the threaded shaft 115 is distal to the detachable adjustment knob 107 and comes into contact with the left-hand side of the rear plate 110. Lateral positioning of the rear optical plate 110 is accomplished by rotation in a first direction of the detachable adjustment knob 107 which causes the threaded shaft 115 to push towards the rear plate 110 causing the rear plate 110 to move to the right as viewed in FIG. 24 whilst rotation in the opposite direction to the first causes a spring 120 to force the rear plate 110 to the left in order to maintain contact with the tip 121 of the threaded shaft 115. The thread used to cause adjustment in this case is a left-hand thread. In the case of the adjustment mechanism on the other temple, the thread used is a right-hand thread.

The invention claimed is:

1. An eyeglasses comprising:
   a pair of optical plates for each eye, with each optical plate comprising a front plate and a rear plate;
   a return and hinge mechanism linking the optical plates of each pair; and
   an adjustment mechanism for facilitating relative movement of the optical plates of each pair in a plane substantially perpendicular to a viewing direction of the eyeglasses;
   wherein the return and hinge mechanism and the adjustment mechanism are decoupled.

2. The eyeglasses according to claim 1, wherein the rear plate is laterally movable.

3. The eyeglasses according to claim 1, wherein the return and hinge mechanism comprises cored lugs and a pin.

4. The eyeglasses according to claim 3, wherein the return and hinge mechanism incorporates a resilient biasing means.

5. The eyeglasses according to claim 4, wherein the resilient biasing means includes a compression spring.

6. The eyeglasses according to claim 3, wherein the return and hinge mechanism incorporates a sliding lock mechanism.

7. The eyeglasses according to claim 3, wherein the return and hinge mechanism incorporates a pair of plate closing cams.

8. The eyeglasses according to claim 1, wherein the adjustment mechanism is located in the vicinity of a temple of a wearer of the eyeglasses during use thereof.

9. The eyeglasses according to claim 1, wherein the adjustment mechanism comprises:
   a temple-hugging clip;
   a threaded sleeve, and
   a threaded pushing member comprising a threaded shaft and an adjustment knob.

10. The eyeglasses according to claim 1, wherein the adjustment mechanism is detachable from a remainder of the eyeglasses.

11. The eyeglasses according to claim 1, wherein the eyeglasses further incorporate movable nose pads.

12. The eyeglasses according to claim 11, wherein the nose pads are rotatably mounted.

13. An adjustment mechanism for use with eyeglasses, the eyeglasses comprising:
   a pair of optical plates for each eye,
   the adjustment mechanism for facilitating relative movement of the optical plates of each pair in a plane substantially perpendicular to a viewing direction, and the adjustment mechanism comprising:
   a temple-hugging clip;

a threaded sleeve; and a threaded pushing member comprising a threaded shaft and an adjustment knob.

14. The adjustment mechanism for use with eyeglasses according to claim 13, wherein the eyeglasses further comprises a return and hinge mechanism linking the optical plates of each pair.

* * * * *